United States Patent
Fujiwara et al.

(10) Patent No.: US 6,800,112 B2
(45) Date of Patent: Oct. 5, 2004

(54) MERCURY RECOVERY METHOD

(75) Inventors: Kenji Fujiwara, Nishinomiya (JP); Kiyokatsu Fujinami, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 10/109,126

(22) Filed: Mar. 28, 2002

(65) Prior Publication Data

US 2002/0167120 A1 Nov. 14, 2002

(30) Foreign Application Priority Data

Mar. 30, 2001 (JP) ........................................ 2001-098690

(51) Int. Cl.⁷ ............................................. C22B 43/00
(52) U.S. Cl. .......................................... 75/431; 75/670
(58) Field of Search .................................. 75/431, 670

(56) References Cited

U.S. PATENT DOCUMENTS 5,106,598 A * 4/1992 Cogar ........................ 423/99
5,891,216 A    4/1999 Washburn et al.

FOREIGN PATENT DOCUMENTS

| | | |
|---|---|---|
| DE | 246 311 | 1/1986 |
| DE | 41 25 417 | 7/1991 |
| DE | 42 09 180 | 3/1992 |
| EP | 0 157 249 | 3/1985 |
| FR | 2 641 288 | 1/1989 |
| GB | 1 373 771 | 3/1971 |
| GB | 1 524 464 | 5/1976 |
| JP | 50 006431 | 3/1975 |
| JP | 5233387 | 3/1977 |
| JP | 01-180291 | 7/1989 |
| JP | 645643 | 6/1994 |
| JP | 1012149 | 1/1998 |
| JP | 10-273741 | 10/1998 |
| JP | 2001-011548 | 1/2001 |
| WO | WO 93/20593 | 10/1993 |
| WO | WO 98/22628 | 5/1998 |

* cited by examiner

Primary Examiner—Melvyn Andrews

(57) ABSTRACT

Both ends of a bulb of a waste fluorescent lamp are cut off, a phosphor layer formed on an interior surface of the bulb is detached, so that mercury-containing phosphor powder can be obtained. The mercury-containing phosphor powder is subjected to a heating and reducing process with the dry-method, by mixing an organic reducing agent with the phosphor powder and heating the mixture, to vaporize and separate mercury from the phosphor powder. The vaporized mercury is then cooled and condensed, to collect mercury.

15 Claims, 7 Drawing Sheets

FIG.4

TABLE 1

|  | REDUCING AGENT | HEATING TEMPERATURE | RESIDUAL RATE OF MERCURY |
|---|---|---|---|
| PRACTICAL EXAMPLE 1 | OXALIC ACID | 600°C | 0.12% |
| PRACTICAL EXAMPLE 2 | ASCORBIC ACID | 600°C | 0.14% |
| COMPARATIVE EXAMPLE 1 | NONE | 600°C | 0.30% |
| COMPARATIVE EXAMPLE 2 | NONE | 800°C | 0.12% |

FIG.5

TABLE 2

|  | RELATIVE LUMINANCE |
|---|---|
| PRACTICAL EXAMPLE 1 | 90% |
| PRACTICAL EXAMPLE 2 | 90% |
| COMPARATIVE EXAMPLE 2 | 75% |

TABLE 3

| | REDUCING AGENT | HEATING TEMPERATURE | RESIDUAL RATE OF MERCURY |
|---|---|---|---|
| PRACTICAL EXAMPLE 1 | OXALIC ACID | 600°C | 0.0005mg/l |
| PRACTICAL EXAMPLE 4 | NONE | 600°C | 0.0005mg/l |
| COMPARATIVE EXAMPLE 1 | NONE | 600°C | 0.0020mg/l |

MERCURY RECOVERY METHOD

BACKGROUND OF THE INVENTION

(1) Field of the Invention

The present invention relates to a mercury recovery method and a mercury recovery apparatus, and particularly to a technique for separating and collecting mercury contained in phosphors used in fluorescent lamps.

(2) Related Art

Mercury, which is a toxic material, is used in lighting devices such as fluorescent lamps. When fluorescent lamps whose life is expired or fluorescent lamps that are found defective during manufacturing processes (hereafter simply referred to as "waste fluorescent lamps") are disposed, mercury is usually to be recovered from the waste fluorescent lamps. The recovered mercury is processed to remove impurities etc., and then is recycled.

As a method for recovering mercury from phosphor powder used in waste fluorescent lamps, the wet-method is conventionally known, one example of which is disclosed in Japanese laid-open patent application No.H10-12149. According to the disclosed method, mercury-containing phosphor powder detached from a waste fluorescent lamp is immersed in an aqueous solution in which active sulfur is dissolved, to form a mercuric sulfide compound that is refractory, so that mercury can be recovered from the phosphor powder.

Also, as another method for recovering mercury from phosphor powder, the dry-method is conventionally known, one example of which is disclosed in Japanese published examined patent application No.S53-1594. This method takes advantage of a characteristic of mercury as being a low-boiling metallic element. According to the disclosed method, mercury-containing phosphor powder is subjected to a heating process to vaporize mercury contained therein, and the vaporized mercury is then cooled and condensed, so that mercury can be recovered from the phosphor powder.

Here, rare-earth phosphors, which are expensive, are often used in fluorescent lamps for general lighting. When waste fluorescent lamps are disposed, therefore, it is desirable to recycle not only mercury, but also phosphor powder from which mercury is separated (hereafter simply referred to as "treated phosphor powder").

However, with the above-described conventional wet-method, a portion of the phosphor powder is dissolved into the aqueous solution containing active sulfur, with the crystal structure of phosphors being destroyed or changed. This causes characteristics of the phosphor powder including luminance to deteriorate, making recycling of the treated phosphor powder impossible.

Further, unlike the dry-method mercury recovery, the wet-method mercury recovery generally requires special equipment for liquid-waste treatment, including treatment of used aqueous solutions etc. Therefore, the wet-method mercury recovery tends to suffer from high-cost, compared with the dry-method mercury recovery.

With the conventional dry-method mercury recovery, substantially all mercury, when being contained in the form of metallic mercury or mercurous oxide, can be separated and collected from phosphor powder. However, the problem is that phosphor powder of life-expired fluorescent lamps, in particular, contain mercury in the form of an amalgam that is formed by reacting with an emitter (emissive material) or a phosphor element. It is difficult to decompose an amalgam by heat, and accordingly it is difficult to separate and collect substantially all mercury from such phosphor powder. To solve this problem, increasing a heating temperature in the heating process may be considered. However, the temperature being too high in the heating process causes thermal degradation of phosphor powder, which results in characteristics of the phosphor powder including luminance deteriorating, making recycling of the treated phosphor powder impossible.

SUMMARY OF THE INVENTION

In view of the above problems, a first objective of the present invention is to provide a mercury recovery method that ensures recovery of mercury in any forms, such as metallic mercury, from phosphor powder, and that enables the treated phosphor powder to be recycled, without requiring special equipment for liquid-waste treatment. A second objective of the present invention is to provide a mercury recovery apparatus that produces the same effect as the mercury recovery method.

The first objective of the present invention can be achieved by a mercury recovery method for recovering mercury from mercury-containing phosphor powder that has been detached from a fluorescent lamp, the mercury recovery method including the steps of: vaporizing mercury contained in the phosphor powder by subjecting the phosphor powder to a heating and reducing process; and condensing the vaporized mercury by cooling, to collect the vaporized mercury.

According to this method, a heating process is carried out in a reducing atmosphere. Therefore, mercury contained in phosphor powder in any forms, such as metallic mercury, mercurous oxide, and an amalgam formed by reacting with an emitter or a phosphor element, can be reduced in the heating process. Therefore, atomization of the mercury in any forms can be facilitated. This can ensure vaporization and separation of substantially all mercury contained in the phosphor powder even at relatively low temperatures. In particular, because the mercury can be vaporized and separated at relatively low temperatures, thermal degradation of the phosphor powder can be reduced. As a result, characteristics of the phosphor powder including luminance can be prevented from deteriorating, enabling the treated phosphor powder to be recycled. Further, because the mercury recovery is achieved with the dry-method, special equipment for liquid-waste treatment that is usually required by the wet-method mercury recovery is not required.

The second objective of the present invention can be achieved by a mercury recovery apparatus that recovers mercury from mercury-containing phosphor powder, including: a reaction vessel; a distillation vessel that is set in the reaction vessel and in which the mercury-containing phosphor powder is placed; a heating unit for heating the distillation vessel; and a mercury collection unit for condensing vaporized mercury by cooling, to collect the vaporized mercury, the vaporized mercury having been vaporized from the mercury-containing phosphor powder in the distillation vessel heated by the heating unit, wherein the distillation vessel includes a heat conductive member that is placed so as to come in contact with a part of an interior wall of the distillation vessel, the heat conductive member being for transmitting heat to middle portions of the phosphor powder within the distillation vessel.

According to this construction, the entire portions of phosphor powder placed in the distillation vessel can be heated uniformly. This can facilitate vaporization and separation of mercury from the phosphor powder. Therefore, the temperature of middle portions of the phosphor powder in the distillation vessel can be increased to a temperature necessary for thermal decomposition of mercury compounds, without excessively increasing a heating temperature by the heating unit. Also, because the phosphor powder is not heated up to excessively high temperatures, thermal degradation of the phosphor power can be reduced. As a result, characteristics of the phosphor powder including luminance can be prevented from deteriorating, enabling the treated phosphor powder to be recycled. Also, because the mercury recovery is achieved with the dry-method, special equipment for liquid-waste treatment that is usually required by the wet-method mercury recovery is not required.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 4 is a table showing experimental results of mercury recovery with the mercury recovery method relating to the first embodiment;

FIG. 5 is a table showing measured results of relative luminance of phosphor powder for practical examples using the mercury recovery method relating to the first embodiment and for comparative examples;

DESCRIPTION OF THE PREFERRED EMBODIMENTS

The following describes preferred embodiments of the present invention, with reference to the drawings.
(First Embodiment)

Figure 1:
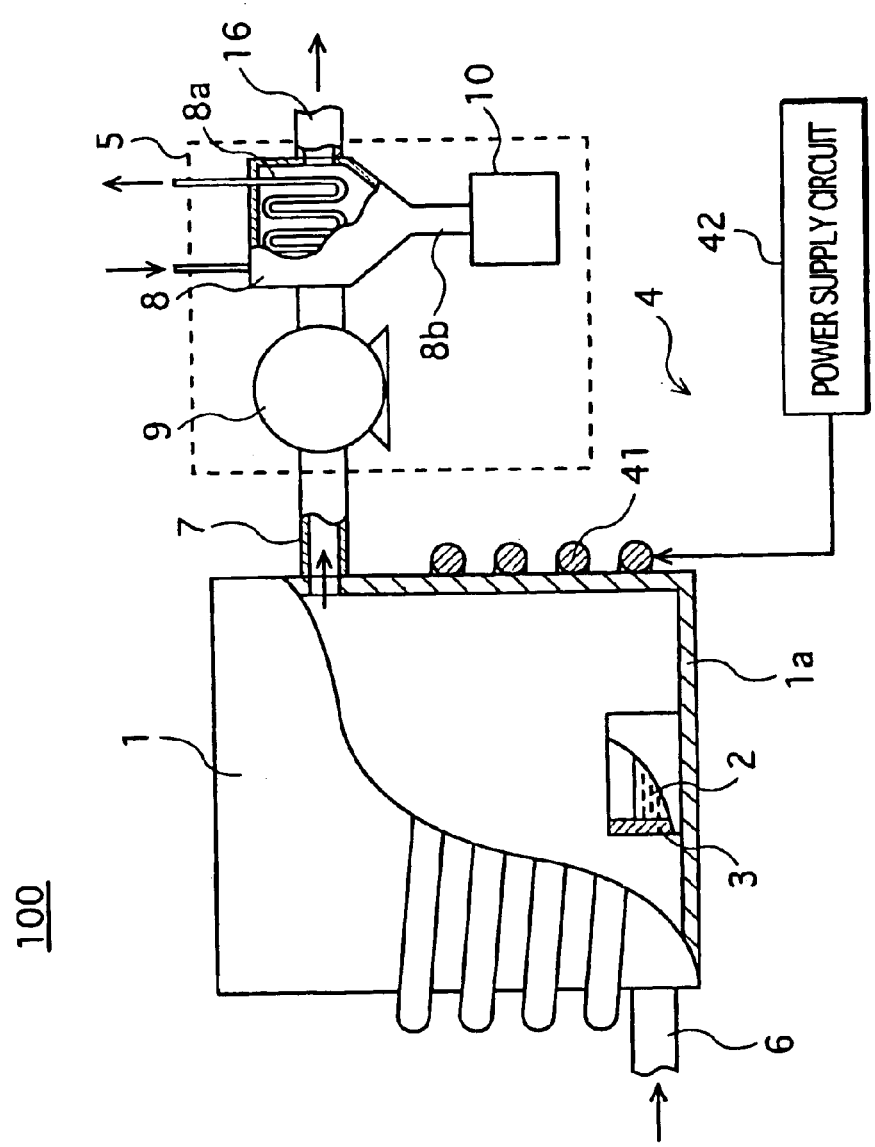
FIG. 1 is a partially cutaway view of a mercury recovery apparatus that is used to realize a mercury recovery method relating to a first embodiment of the present invention.

FIG. 1 shows the construction of a mercury recovery apparatus 100 that is used to realize a mercury recovery method according to the first embodiment of the present invention.

As shown in the figure, the mercury recovery apparatus 100 includes a cylindrical reaction vessel 1 that is made of metal and can be hermetically sealed, a cylindrical distillation vessel 3 that is set on the bottom of the reaction vessel 1 and into which a mixture 2 of mercury-containing phosphor powder and an organic reducing agent is to be placed, a heating apparatus 4 that heats the mixture 2 placed in the distillation vessel 3 to vaporize and separate mercury from the phosphor powder, and a mercury collection unit 5 that pumps in the mercury vapor from the reaction vessel 1, and cools and condenses the mercury vapor to collect the mercury.

The distillation vessel 3 is made of a stainless steel and is detachable from a bottom 1a of the reaction vessel 1. Also, a pipe 6 for supplying gases, such as nitrogen and air, into the reaction vessel 1 is connected to a lower side surface of the reaction vessel 1. A pipe 7 for discharging the gases from the reaction vessel 1 into the mercury collection unit 5 is connected to an upper side surface of the reaction vessel 1.

The heating apparatus 4 includes, for example, a heater 41 that is coiled up around the exterior surface of the reaction vessel 1, and a power supply circuit 42 for supplying power to the heater 41. Within the reaction vessel 1, a temperature sensor (not shown) such as a thermocouple is provided. Based on a value detected by the temperature sensor, the power supply circuit 42 controls power supply to the heater 41 so as to heat up the mixture 2 to a predetermined temperature, and also to keep an atmospheric temperature within the reaction vessel 1 at the predetermined temperature.

The mercury collection unit 5 includes a mercury condensing unit 8 for cooling and condensing vaporized mercury, a suction pump 9 for pumping the vaporized mercury from the reaction vessel 1 into the mercury condensing unit 8, and a mercury collection vessel 10 in which the condensed mercury is collected.

As one example of the suction pump 9, a rotary pump is used. In the present embodiment, the mercury condensing unit 8 is of water-cooling type. A pump (not shown) circulates cooled water in an internally equipped metallic pipe 8a. This water circulation cools the mercury vapor down to approximately 0° C. and thereby condenses the mercury vapor. The condensed mercury is collected in the mercury collection vessel 10 via a pipe 8b.

The following describes a method for detaching phosphor powder from a waste fluorescent lamp, and separating and collecting mercury from the detached phosphor powder using the above-described mercury recovery apparatus 100.

Figure 2:
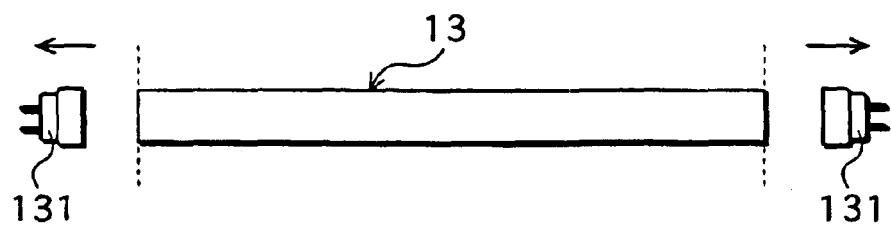
FIG. 2 shows a state where both ends of a fluorescent lamp are cut off.

As FIG. 2 shows, both ends including end caps 131 of a waste fluorescent lamp 13 in which mercury is enclosed are cut off.

Figure 3:
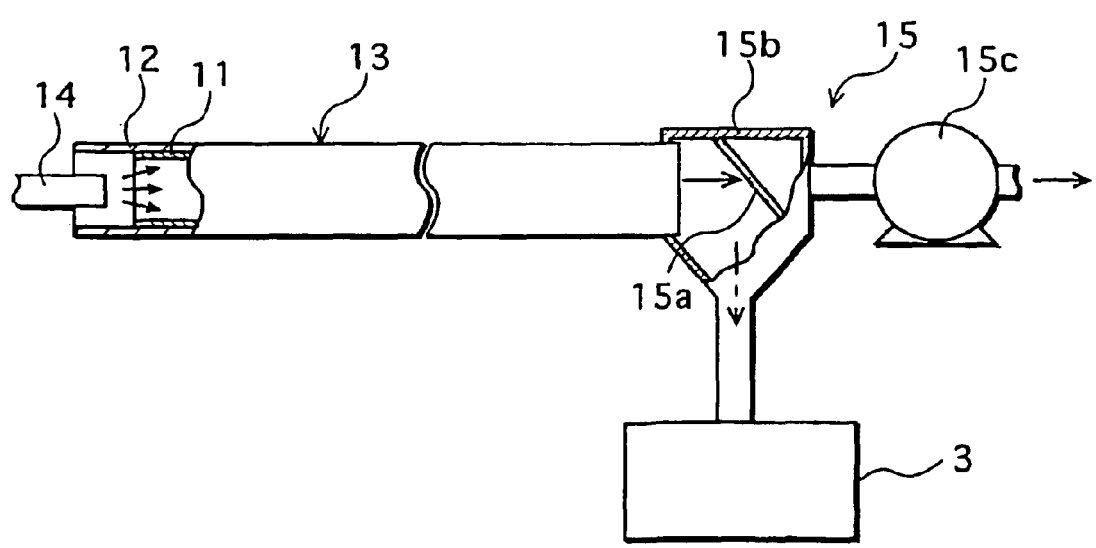
FIG. 3 is a diagram for explaining a process for detaching a phosphor layer from the fluorescent lamp whose both ends are cut off.

As FIG. 3 shows, an air nozzle 14 is inserted into one opening end of a bulb 12 of the waste fluorescent lamp 13 whose both ends have been cut off, and an aspirator 15 is attached to the other opening end of the bulb 12. Air with a predetermined pressure is insufflated onto the interior surface of the bulb 12 from the air nozzle 14, so as to detach a phosphor layer 11. The detached phosphor layer 11 is aspirated by the aspirator 15 in a state of being powdered. The aspirator 15 includes an enclosure 15b internally equipped with a high-density filter 15a, and a vacuum pump 15c for depressurizing the inside of the envelope 15b to a negative pressure. The phosphor powder that has been detached by air blow from the air nozzle 14 and aspirated into the envelope 15b is filtered through a filter 15a. The phosphor powder is gradually sieved out, and is collected into the distillation vessel 3 placed below the envelope 15b.

Following this, an aqueous solution of an organic reducing agent whose constituents include carbon, oxygen, and hydrogen that are unreactive to phosphor powder is added into the distillation vessel 3. The aqueous solution and the phosphor powder are stirred and mixed thoroughly, to generate a mixed solution (the mixture 2 in FIG. 1). The reason for mixing the organic reducing agent dissolved for example in water with the phosphor powder is to uniformly mix the phosphor powder and the organic reducing agent and to uniformly cause atomization of mercury in the entire phosphor powder. The atomized mercury has a lower boiling point, and therefore, can be vaporized and separated from the phosphor powder when heated at relatively low temperatures.

Note here that the constituents of the organic reducing agent may not be limited to the above-listed carbon, oxygen, and hydrogen, but may further include other elements that are unreactive to phosphor powder such as nitrogen. Note also that, as the organic reducing agent, it is preferable to select at least one from the group consisting of ascorbic acid, oxalic acid, formic acid, maleic acid, citric acid, malonic acid, stearic acid, phthalic acid, tartaric acid, succinic acid, and sulfamic acid.

Following this, as FIG. 1 shows, the distillation vessel 3, in which the mixture 2 of the phosphor powder and the organic reducing agent is placed, is set within the reaction vessel 1. Then, power is supplied to the heater 41 of the heating apparatus 4, to heat the mixture 2 in the distillation vessel 3 via the reaction vessel 1. In this way, the detached phosphor powder is subjected to a heating and reducing process with the dry-method.

This heating and reducing process causes the following chemical reaction. Atomization occurs to mercury in any forms contained in the phosphor powder, such as metallic mercury, mercurous oxide, and an amalgam formed by reacting with an emitter or a phosphor element. More specifically, carbon monoxide, methane, and hydrogen, which are decomposition products of the reducing agent, reduce the mercury in any forms so as to have a valence of zero. The atomized mercury is then vaporized and separated from the phosphor powder.

Here, an internal pressure of the reaction vessel 1 may be an atmospheric pressure. In view of preventing thermal oxidization of the phosphor powder, however, it is more preferable to reduce the internal pressure (to 20000 Pa for example) with the use of the suction pump 9. Also, an internal atmosphere of the reaction vessel 1 may be an air atmosphere. In view of further preventing thermal oxidization of the phosphor powder, however, it is more preferable to introduce a nitrogen atmosphere in the reaction vessel 1. In this case, a nitrogen gas cylinder is connected to the pipe 6 via a pressure reducer or the like.

Also, a heating temperature of the mixture 2 is set equal to or higher than such a temperature that can thermally decompose at least mercury in any forms contained in the phosphor powder. For example, when only metallic mercury and mercurous oxide are contained in the phosphor powder, the heating temperature is set equal to or higher than 450° C. When an amalgam is contained in the phosphor powder in addition to these, the mixture 2 is to be heated up to approximately 600° C.

The vaporized mercury within the reaction vessel 1 is pumped by the suction force of the suction pump 9 into the mercury condensing unit 8 via the pipe 7. In the mercury condensing unit 8, the mercury vapor is cooled and condensed, resulting in mercury drops being collected into the mercury collection vessel 10.

Gases other then mercury pumped into the mercury condensing unit 8 by the suction pump 9, which include for example decomposition products of the reducing agent, are discharged outside via a pipe 16. Here, the produced gases are mostly carbon dioxide and water vapor, which are harmless to be released outside without any treatment. Accordingly, special equipment for disposing such gases is not required.

The mercury collected in the mercury collection vessel 10 is further processed by industrial experts to remove impurities, and then is recycled.

On the other hand, the phosphor powder remaining in the distillation vessel 3 is put through a sieve (not shown) to remove glass pieces etc. that are mixed therein when the phosphor layer 11 formed on the interior surface of the bulb 12 is detached. The sieved phosphor powder is processed with a well-known air classification apparatus (not shown) to further remove fine impurities, resulting in the phosphor powder containing no impurities. The phosphor powder containing no impurities is washed and dried, and then is recycled.

The following sums up the above-described mercury recovery method for separating and collecting mercury from phosphor powder in the fluorescent lamp 13 equipped with the bulb 12 on the interior surface of which a phosphor layer made of phosphor powder is formed. The bulb 12 is first cut off, and then the phosphor layer 11 is detached from the interior surface of the bulb 12 to obtain mercury-containing phosphor powder. The obtained phosphor powder is subjected to the heating and reducing process with the dry-method, to vaporize and separate mercury from the phosphor powder. Then, the vaporized mercury is cooled and condensed, to collect the mercury. According to this method, the heating and reducing process causes the atomization reaction of mercury in any forms such as metallic mercury, mercurous oxide, and an amalgam formed by mercury reacting with an emitter or a phosphor element. More specifically, the reducing agent reduces the mercury of any forms so as to have a valence of zero. Therefore, it is ensured that substantially all mercury contained in the phosphor powder can be vaporized and separated from the phosphor powder at relatively low temperatures. In particular, because mercury can be vaporized and separated from the phosphor powder at relatively low temperatures due to the action of reducing agent, thermal degradation of the phosphor powder can be reduced, thereby preventing characteristics of the phosphor powder including luminance from deteriorating.

This method enables treated phosphor powder that has conventionally been disposed without any choices to be recycled, and so is extremely economical. Further, because this method employs the dry-method, special equipment for liquid-waste treatment that is usually required by the wet-method mercury recovery is not required.

Also, this method uses an organic reducing agent whose constituents are carbon, oxygen, and hydrogen, the decomposition products of the organic reducing agent including carbon monoxide, methane, and hydrogen etc. These decomposition products do not react with the phosphor powder, and therefore, do not remain in the phosphor powder.

EXPERIMENTAL EXAMPLES

The following describes experimental examples that can verify the effect of the mercury recovery method relating to the first embodiment.

First, phosphor powder was detached from a waste straight-tube fluorescent lamp 13 with rated power of 40W whose life has been expired. Phosphors used in this waste fluorescent lamp 13 are rare-earth phosphors with the following compositions:

| | |
|---|---|
| Red phosphor | $Y_2O_3$:Eu |
| Blue phosphor | $(SrCaBa)_5(PO_4)_3Cl$:Eu |
| Green phosphor | $LaPO_4$:Tb, Ce |

An amount of mercury contained in the detached phosphor powder, that is, phosphor powder from which mercury was yet to be separated (hereafter simply referred to as "untreated phosphor powder") was 2800 µg per phosphor powder 2g.

To prepare a mixture A (practical example 1), the untreated phosphor powder was mixed with an aqueous solution in which oxalic acid was being dissolved, at a rate of oxalic acid 0.4 g (20 wt %) to phosphor powder 2 g.

To prepare a mixture B (practical example 2), the untreated phosphor powder was mixed with an aqueous solution in which ascorbic acid was being dissolved, at a rate of ascorbic acid 0.4 g (20 wt %) to phosphor powder 2 g.

The mixture A and the mixture B were placed in separate distillation vessels 3. As to each of the mixtures A and B, mercury was separated and collected from the phosphor powder using the mercury recovery method relating to the present embodiment under the conditions of: heating temperature 600° C.; heating time 30 min.; an atmospheric pressure; and an air atmosphere. Then, a residual rate (%) of mercury contained in the treated phosphor powder with respect to mercury contained in the untreated phosphor powder was measured. The experimental results are shown in Table 1 in FIG. 4.

Comparative experiments (comparative examples 1 and 2) were carried out as follows. For the comparative example 1, the detached phosphor powder was directly placed in a distillation vessel 3 without adding any reducing agent. Then, mercury was separated and collected from the phosphor powder using the same method and under the same conditions as in the above practical examples 1 and 2. A residual rate (%) of mercury contained in the treated phosphor powder with respect to mercury contained in the untreated phosphor powder was measured. For the comparative example 2, the detached phosphor powder was directly placed in a distillation vessel 3 without adding any reducing agent. Then, mercury was separated and collected from the phosphor powder with the same method and under the same conditions as in the above practical examples 1 and 2 except that the heating temperature was set at 800° C. for the comparative example 2. A residual rate (%) of mercury contained in the treated phosphor powder with respect to mercury contained in the untreated phosphor powder was measured. The experimental results of the comparative examples 1 and 2 are also shown in Table 1.

Note here that the residual rate of mercury (%) was measured in the following way. The phosphor powder, from which mercury was separated, was dissolved into aqua regia, and then an amount of mercury in the resulting solution was measured using hydride generation atomic absorption spectrometry. Note also that an air inflow to the reaction vessel 1 was set at 2l/min. in each of the practical examples and the comparative examples.

As Table 1 shows, the residual rate of mercury is 0.12% for the practical example 1, 0.14% for the practical example 2, and 0.12% for the comparative example 2. On the other hand, the residual rate of mercury is 0.30% for the comparative example 1.

The reason for the results implying that the residual rate of mercury is higher for the comparative example 1 than for the practical examples 1 and 2 and the comparative example 2 can be considered as follows. The heating temperature of the heater 41 being approximately 600° C. is not high enough to decompose an amalgam formed by mercury reacting with an emitter or a phosphor element that is hard to decompose by heat. The reason for this is considered that a temperature of middle portions of the phosphor powder placed in the distillation vessel 3 does not reach 600° C. For the comparative example 1, therefore, mercury contained in the phosphor powder in the form of such an amalgam remains in the phosphor powder. On the other hand, for the comparative example 2, the heating temperature of the heater 41 being 800° C. can decompose mercury contained in the form of such an amalgam that is difficult to decompose by the heating temperature being approximately 600° C. As for the practical examples 1 and 2, the residual rate of mercury is low, despite the heating temperature of the heater 41 being approximately 600° C. The reason for this can be considered that vaporization and separation of mercury in any forms including an amalgam formed by reacting with an emitter or a phosphor element are facilitated because the heating process is carried out in an reducing atmosphere.

Next, for the practical examples 1 and 2 and the comparative example 2, a relative luminance (%) of the treated phosphor powder to a luminance of the untreated phosphor powder (assumed to be 100%) was examined. The experimental results are shown in Table 2 in FIG. 5.

As Table 2 shows, the relative luminance is 90% for the practical examples 1 and 2, and 75% for the comparative example 2. The reason for this can be considered as follows. For the practical examples 1 and 2, the heating temperature of phosphor powder is 600° C., which is relatively low, and therefore, thermal degradation of the phosphor powder can be reduced. On the other hand, for the comparative example 2, the heating temperature of phosphor powder is 800° C., which is high, and therefore, thermal degradation of the phosphor powder occurs.

The above experiments verify the following. As described above, for the practical examples 1 and 2, it is ensured that substantially all mercury in any forms including metallic mercury can be separated and collected from the phosphor powder. Further, thermal degradation of the phosphor powder can be reduced, and therefore, the treated phosphor powder can be recycled.

It should be noted here that although an amount of ascorbic acid and an amount of oxalic acid are each set at 20 wt % to the phosphor powder in the above practical examples 1 and 2, a rate of these organic reducing agents to the phosphor powder is not limited to such a value.

Figure 6:
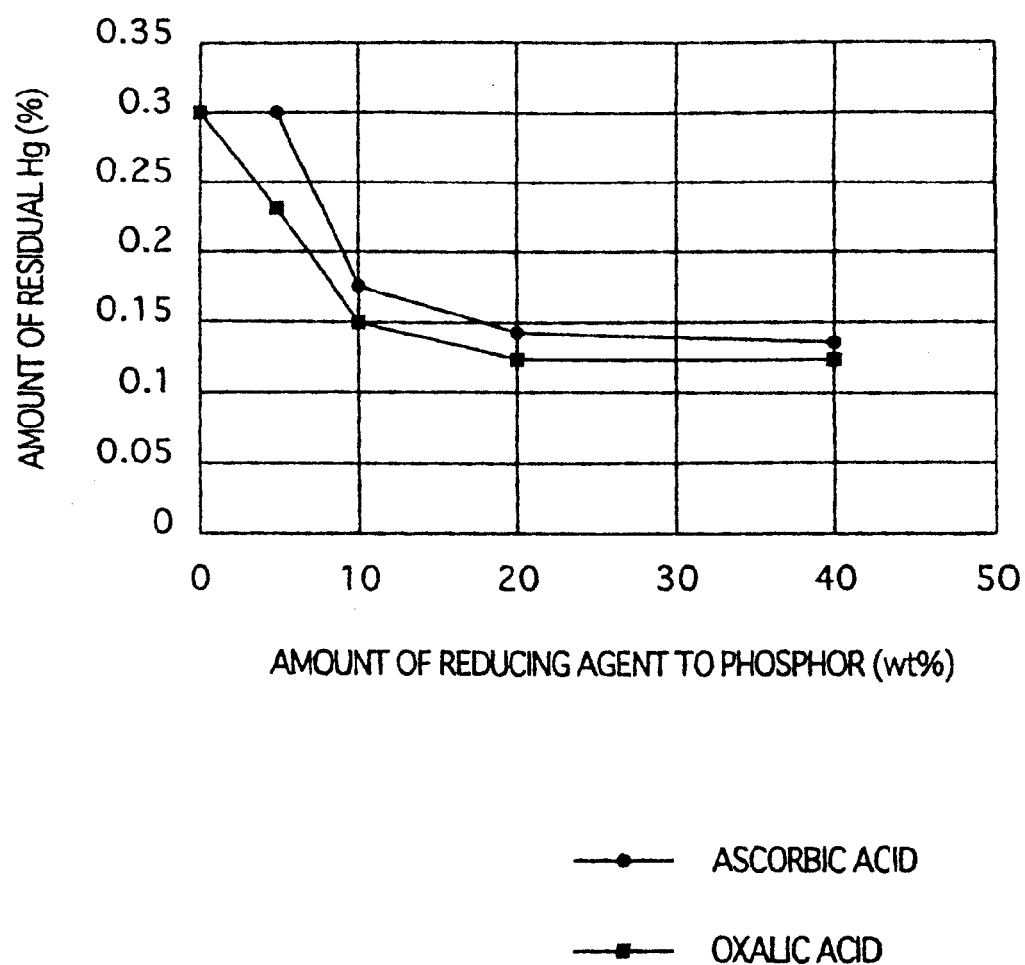
FIG. 6 is a graph showing the relationship between an amount of organic reducing agent (wt %) to be added to phosphor powder and an amount of residual mercury in treated phosphor powder (%)

FIG. 6 is a graph showing the experimental results relating to the relationship between (a) the amount of ascorbic acid/oxalic acid added to the phosphor powder and (b) the amount of mercury remaining in the treated phosphor powder. The horizontal axis indicates the amount of organic reducing agent (wt %) to be added to the phosphor powder, and the vertical axis indicates the amount of mercury (%) remaining in the treated phosphor powder with respect to the amount of mercury contained in the untreated phosphor powder.

As the graph shows, with the amount of ascorbic acid/oxalic acid being less than 10 wt % to the phosphor powder, the residual mercury amount is relatively high. With the amount of ascorbic acid/oxalic acid being about 10 wt % to the phosphor powder, the residual mercury amount drops drastically. With the amount of ascorbic acid/oxalic acid being in a range of 10 to 20 wt % to the phosphor powder, the residual mercury amount decreases only slightly. With the amount of ascorbic acid/oxalic acid being more than 20 wt % to the phosphor powder, the residual mercury amount hardly decreases.

These experimental results imply that it is preferable to set the amount of organic reducing agent at 10 wt % or more with respect to phosphor powder. These experimental results also imply that an excessively large amount of organic reducing agent does not produce more favorable reducing action but results in the phosphor powder being discolored brown due to its residual materials, and accordingly, an excessively large amount of organic reducing agent rather hinders the process of enabling the phosphor powder to be recycled. In conclusion, an excessively large amount of organic reducing agent does not produce the effect of facilitating vaporization and separation of mercury, but rather produces the adverse effect of discoloring the phosphor powder. To be more specific, there seems to be no reason to add the organic reducing agent by 20 wt % or more to the phosphor powder, because with the amount of organic reducing agent being more than 20 wt % to the phosphor powder, the residual mercury amount hardly decreases. It should be noted here that discoloration of the phosphor powder was not observed with the amount of organic reducing agent being 20 wt % to the phosphor powder.

As can be known from the above, it is preferable to set the amount of organic reducing agent in a range of 10 to 20 wt % inclusive with respect to the phosphor powder.

Also, although the present embodiment describes the case where oxalic acid or ascorbic acid is used as the organic reducing agent, substantially the same effect as produced above can be produced when at least one organic reducing agent selected from the group consisting of formic acid, maleic acid, citric acid, malonic acid, stearic acid, phthalic acid, tartaric acid, succinic acid, and sulfamic acid, is used.

(Second Embodiment)

The following descries a mercury recovery apparatus according to a second embodiment of the present invention. This mercury recovery apparatus has the same construction as the mercury recovery apparatus 100 (FIG. 1) used to realize the mercury recovery method in the first embodiment, except that a dividing member 17 made of a heat conductive material is provided in the distillation vessel 3. Accordingly, the present embodiment is described focusing only on the distillation vessel 3.

Figure 7A:
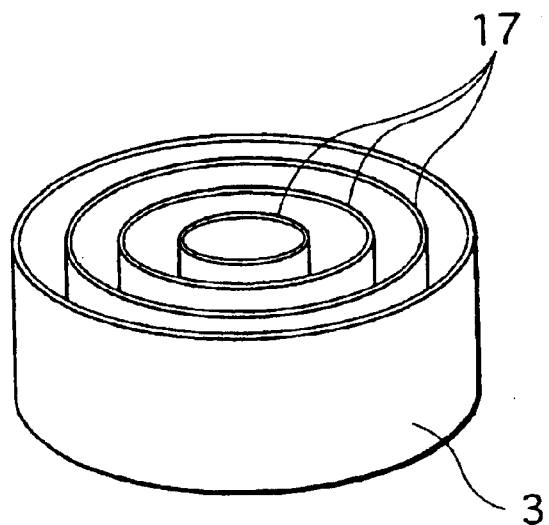
FIG. 7A shows an appearance of a distillation vessel in a mercury recovery apparatus relating to a second embodiment of the present invention.
Figure 7B:
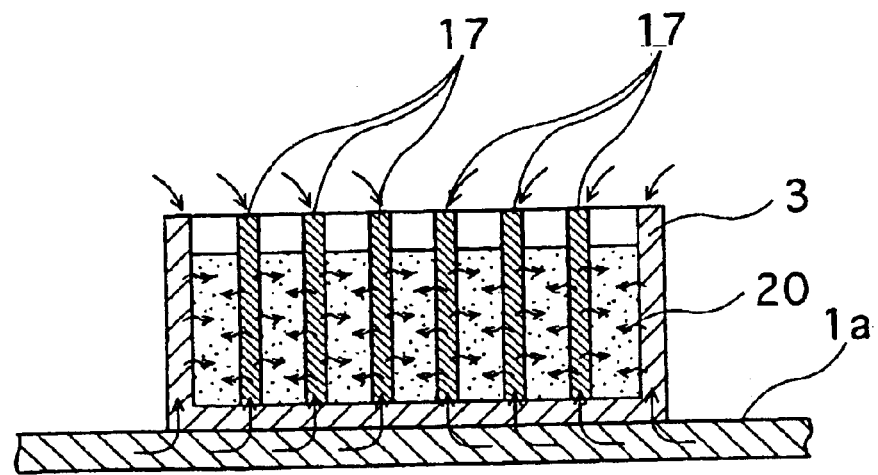
FIG. 7B schematically shows heat transmission paths when the distillation vessel is used.

FIG. 7A is a perspective view showing one example of the distillation vessel 3 in the second embodiment. As shown in the figure, three stainless cylindrical members each having a different diameter that form the dividing member 17 are placed substantially concentrically within the distillation vessel 3. FIG. 7B schematically shows the state where heat is transmitted to phosphor powder 20 within the distillation vessel 3 in the reaction vessel 1. For ease of explanation, the figure shows a vertical section of the distillation vessel 3 etc. in FIG. 7A.

Arrows in FIG. 7B each roughly indicate a heat transmission path. As shown in the figure, heat applied to the reaction vessel 1 by the heater 41 is directly applied to the entire portions of the phosphor powder 20 including middle portions in the distillation vessel 3, via the bottom 1a of the reaction vessel 1, the bottom of the distillation vessel 3, and the dividing member 17. Also, heat from the interior wall of the reaction vessel 1 is easily transmitted to the phosphor powder via the dividing member 17. This enables the entire portions of the phosphor powder 2 to be heated at substantially uniform temperatures.

Figures 8, 9:
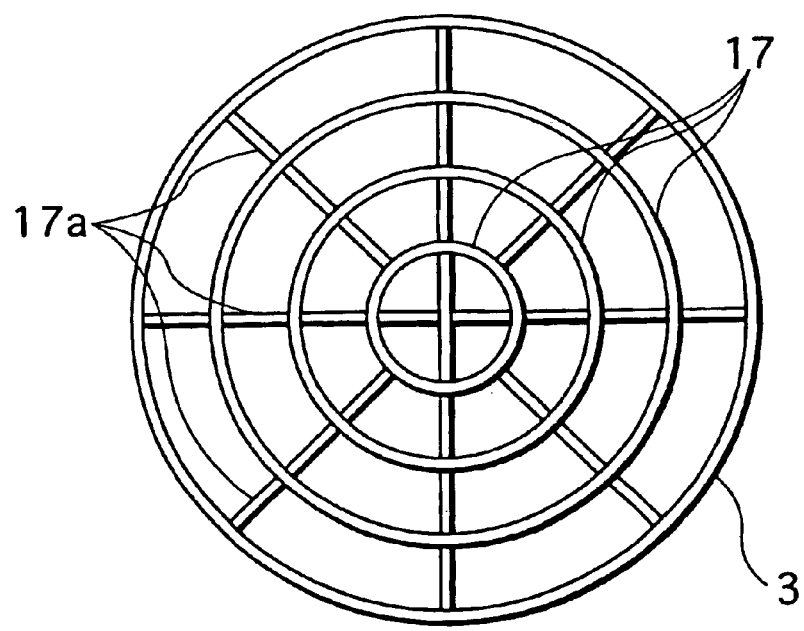
FIG. 8 is a table showing experimental results of mercury recovery by the mercury recovery apparatus relating to the second embodiment.
FIG. 9 is a plan view of the distillation vessel in which a dividing member of another example is provided.

Using this mercury recovery apparatus equipped with the distillation vessel 3 in which the dividing member 17 is provided (practical example 4), mercury was separated and collected from phosphor powder to which no organic reducing agent was added, using the same method and under the same conditions as for the comparative example 1. A residual amount (mg/l) of mercury contained in the treated phosphor powder was measured. The experimental results are shown in Table 3 in FIG. 8.

It should be noted here that the residual amount of mercury was calculated based on the elution test method set forth in Notification No.13 of the Environment Agency of Japan. For comparison purposes, residual amounts of mercury for the practical example 1 and the comparative example 1 in Table 1 in FIG. 4 in the first embodiment were also calculated based on the same elution test method, and are shown in Table 3.

As Table 3 shows, the residual amount of mercury is 0.0005 mg/l for the practical example 4, which is the same for the practical example 1. On the other hand, the residual amount of mercury is 0.0020 mg/l for the comparative example 1. The reason for the results implying that the residual amount of mercury for the practical example 4, where an organic reducing agent is not added to phosphor powder, i.e., where not a heating and reducing process but a heating process is involved, is the same as the residual amount of mercury for the practical example 1, where a heating and reducing process is involved, can be considered as follows. The entire portions of the phosphor powder are heated uniformly at 600° C. via the heat-conductive dividing member 17 provided in the distillation vessel 3, thereby facilitating vaporization and separation of mercury from the phosphor powder.

As described above, the mercury recovery apparatus in the present embodiment has an extremely simple construction where a dividing member is additionally provided in a reaction vessel 1 in a conventional mercury recovery apparatus, but has the effect of uniformly heating the entire portions of phosphor powder and facilitating vaporization and separation of mercury from the phosphor powder. This mercury recovery apparatus can ensure vaporization and separation of substantially all mercury contained in the phosphor powder at relatively low temperatures.

In particular, because mercury can be vaporized and separated from the phosphor powder at relatively low temperatures, thermal degradation of the phosphor powder can be reduced. Accordingly, characteristics of the phosphor powder including luminance can be prevented from deteriorating. This enables the treated phosphor powder to be recycled. Also, the mercury recovery is achieved with the dry-method, and therefore, special equipment for liquid-waste treatment that is usually required by the wet-method mercury recovery is not required.

It should be noted here that although the present embodiment describes the case where three cylindrical members forming the dividing member 17 are substantially concentrically placed in the distillation vessel 3, the number of cylindrical members is of course not limited to three. Further, a dividing member 17a formed by plate members may be provided radially that the plate members of the dividing member 17a intersect the cylindrical members of the dividing member 17 as indicated by a plan view of the distillation vessel 3 shown in FIG. 9. In this case, an area of the interior wall of the distillation vessel 3 that comes in contact with the dividing members is expanded, enabling heat to be transmitted more easily to the phosphor powder inside the vessel. Therefore, the entire portions of the phosphor powder can be heated more uniformly.

The dividing member 17 may be fixed inside the distillation vessel 3 in advance, or may be constructed to be detachable from the distillation vessel 3.

Figure 10:
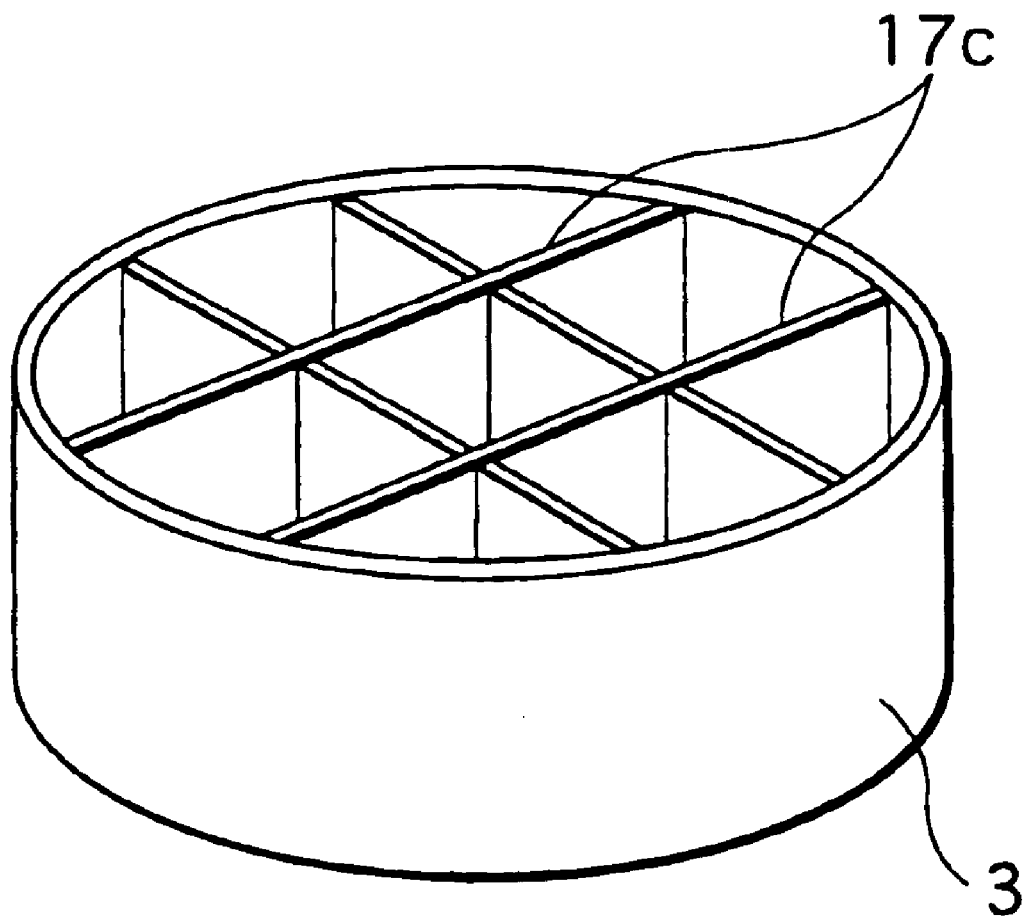
FIG. 10 shows an appearance of the distillation vessel in which a dividing member of another example is provided.

Also, the dividing member may take other forms. For example, a dividing member 17c that is formed by arranging, in a lattice, plate members with high heat-conductivity such as stainless members may be provided in the distillation vessel 3 as shown in FIG. 10. The internal space of the distillation vessel 3 may not be divided completely as the case may be. For example, a mass of thermal conductive material placed at the center or the like of the distillation vessel 3 can produce the effect of uniformly heating the phosphor powder to a certain degree.

Also, although the above embodiments describe the case where the distillation vessel 3 is made of a stainless steel, vessels made of other materials that are unreactive to an organic reducing agent, such as alumina and graphite carbon, may instead be used.

Also, as a material for a dividing member, ceramics, quartz glass, and the like may be used depending on the case, instead of the above-mentioned materials with high heat-conductivity such as a stainless steel. Ceramics or quarts glass may not have a higher heat-conductivity than phosphors. However, ceramics or quarts glass is advantageous because it does not react with phosphors, and has high heat resistance. Moreover, it is considered that phosphors in the powder form have extremely low heat-conductivity because of a lot of gaps between the particles. Therefore, the heat-conductivity of a dividing member made of ceramics or quarts is higher than the heat-conductivity of the phosphor powder. Accordingly, the dividing member made of ceramics or quarts can still produce the effect of uniformly heating the phosphor powder.

Also, although the above embodiments describe the case where mercury is recovered from rare-earth phosphor powder, the present invention is applicable in various other cases, for example, a case where mercury is recovered from halo-phosphate luminescent material powder.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mercury recovery method for recovering mercury from mercury-containing phosphor powder that has been detached from a fluorescent lamp, the mercury recovery method comprising the steps of:

vaporizing mercury contained in the phosphor powder by subjecting the phosphor powder to a heating and reducing process; and condensing the vaporized mercury by cooling, to collect the vaporized mercury.

2. The mercury recovery method of claim 1, wherein a reducing agent used for the heating and reducing process is an organic reducing agent that includes, as constituents, carbon, oxygen, and hydrogen, and the heating and reducing process is realized by heating a mixture of the organic reducing agent and the phosphor powder.

3. The mercury recovery method of claim 2, wherein a ratio of the organic reducing agent to the phosphor powder in the mixture is in a range of 10 to 20 wt % inclusive.

4. The mercury recovery method of claim 2, wherein the mixture is formed by adding the phosphor powder into an aqueous solution of the organic reducing agent and stirring the aqueous solution into which the phosphor powder has been added.

5. The mercury recovery method of claim 2, wherein as the organic reducing agent, at least one is selected from the group consisting of ascorbic acid, oxalic acid, formic acid, maleic acid, citric acid, malonic acid, stearic acid, phthalic acid, tartaric acid, succinic acid, and sulfamic acid.

6. The mercury recovery method of claim 1, wherein the heating and reducing process is carried out in an atmosphere that has a lower pressure than an atmospheric pressure.

7. The mercury recovery method of claim 1, wherein the heating and reducing process is carried out in an atmosphere of a gas that does not oxidize the phosphor powder.

8. The mercury recovery method of claim 7, wherein the gas that does not oxidize the phosphor powder is nitrogen.

9. The mercury recovery method of claim 1, wherein a heating temperature for the heating and reducing process is approximately 600° C.

10. A mercury recovery method for recovering mercury from a mercury-containing phosphor layer in a fluorescent lamp, the mercury recovery method comprising the steps of:

obtaining mercury-containing phosphor powder by cutting a bulb of the fluorescent lamp and detaching the mercury-containing phosphor layer formed on an interior surface of the bulb;

vaporizing mercury contained in the phosphor powder by subjecting the phosphor powder to a heating and reducing process; and condensing the vaporized mercury by cooling, to collect the vaporized mercury.

11. A mercury recovery method for recovering mercury from a mercury-containing phosphor layer in a fluorescent lamp, the mercury recovery method comprising the steps of:

cutting the fluorescent lamp to provide a pair of openings in the fluorescent lamp;

applying a predetermined pressure of a gas at one opening of the fluorescent lamp to detach the phosphor layer from the fluorescent lamp;

applying an aspirator unit at the other opening of the fluorescent lamp to collect the detached phosphor layer;

mixing the collected phosphor layer with an aqueous solution of an organic reducing agent;

heating and reducing the aqueous solution and phosphor layer in a non-oxidizing environment to vaporize the mercury; and condensing the vaporized mercury.

12. The mercury recovery of claim 11 wherein as the organic reducing agent, at least one is selected from a group consisting of ascorbic acid, oxalic acid, formic acid, maleic acid, citric acid, malonic acid, stearic acid, phthalic acid, tartaric acid, succinic acid, and sulfamic acid.

13. The mercury recovery of claim 12 wherein the heating and reducing process is carried out in an atmosphere that has a lower pressure than an atmospheric pressure.

14. The mercury recovery of claim 13 wherein a heating temperature for the heating and reducing process is approximately 600° C.

15. A mercury recovery method for recovering mercury from a mercury-containing phosphor layer in a fluorescent lamp, the mercury recovery method comprising the steps of:

obtaining mercury-containing phosphor powder by cutting a bulb of the fluorescent lamp and detaching the mercury-containing phosphor layer formed on an interior surface of the bulb;

collecting the mercury-containing phosphor layer as a dry powder;

depositing the mercury-containing phosphor powder into a heat-exchanging vessel having a plurality of walls dividing the mercury-containing phosphor;

applying heat of approximately 600° C. uniformly to the mercury-containing phosphor powder through the plurality of walls to vaporize the mercury by a gas phase reaction to leave the phosphor in the heat-exchanging vessel; and condensing the vaporized mercury by cooling, to collect the vaporized mercury.

\* \* \* \* \*